US009237226B2

(12) United States Patent
Frauenthal et al.

(10) Patent No.: US 9,237,226 B2
(45) Date of Patent: *Jan. 12, 2016

(54) CONTROLLING ECHO IN A WIDEBAND VOICE CONFERENCE

(71) Applicant: Cisco Technology, Inc., San Jose, CA (US)

(72) Inventors: James C. Frauenthal, New York, NY (US); Michael A. Ramalho, Sarasota, FL (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/552,723

(22) Filed: Nov. 25, 2014

(65) Prior Publication Data
US 2015/0078549 A1     Mar. 19, 2015

Related U.S. Application Data

(63) Continuation of application No. 11/877,259, filed on Oct. 23, 2007, now Pat. No. 8,923,509.

(51) Int. Cl.
*H04M 9/08* (2006.01)
*H04M 3/00* (2006.01)
*H04M 3/56* (2006.01)

(52) U.S. Cl.
CPC .............. *H04M 3/002* (2013.01); *H04M 9/082* (2013.01); *H04M 3/568* (2013.01)

(58) Field of Classification Search
CPC ....... H04M 9/082; H04M 3/002; H04M 1/58; H04M 2250/62; H04M 3/562; H04M 3/564; H04M 9/08; G10L 21/0208; G10L 19/012; G10L 21/02; G10L 19/0208; H04Q 1/45; H04Q 11/04; G10K 11/1788; G10K 2210/1282; G10K 2210/112; G10K 2210/1081; G10K 11/1784; H04B 3/20; H04B 3/23; H04B 3/238; H04B 3/38; H04J 1/00; H04L 5/16
USPC ........ 381/71.1–71.14; 379/3, 406.01–406.16; 370/286–292
See application file for complete search history.

(56) References Cited

U.S. PATENT DOCUMENTS 4,591,670 A * 5/1986 Itoh .......................... H04B 3/20
                                                                               370/288
4,609,787 A     9/1986 Horna
(Continued)

OTHER PUBLICATIONS

Biamp Professional Audio Systems—AudiaFLEX obtained from http://www.biamp.com/audiflex.php, 3 pages.
(Continued)

*Primary Examiner* — Akelaw Teshale
(74) *Attorney, Agent, or Firm* — Parker Ibrahim & Berg LLC; James M. Behmke; Stephen D. LeBarron

(57) ABSTRACT

In one embodiment, an echo canceller configured to cancel echo in a wideband voice conference is provided. A double-talk condition may be when a plurality of users are speaking substantially simultaneously. When a double-talk condition is detected in the wideband conference, a high-frequency process is enabled and used to process signals in the high band to reduce echo. Accordingly, echo in the high band may not be produced by end devices being used by the users' speaking. Also, the users speaking have the echo cancelled in the low band and substantial echo does not result. This results in the users speaking experiencing the conference in the narrowband. The other users that are not speaking, however, continue to receive wideband signals. The users not speaking also continue to have echo cancellation performed for the high band and low band because these users are not speaking and thus attenuation of their voices is not a consideration.

20 Claims, 6 Drawing Sheets

(56) References Cited

U.S. PATENT DOCUMENTS

| | | | | |
|---|---|---|---|---|
| 5,774,561 A * | 6/1998 | Nakagawa | ............ | H04M 9/082 |
| | | | | 379/406.14 |
| 6,266,409 B1 | 7/2001 | Laberteaux et al. | | |
| 6,628,781 B1 * | 9/2003 | Grundstrom | .......... | H04M 9/082 |
| | | | | 379/406.08 |
| 6,865,270 B1 | 3/2005 | Troxel | | |
| 7,764,783 B1 * | 7/2010 | Pai | ........................ | H04M 9/082 |
| | | | | 370/286 |
| 7,912,211 B1 * | 3/2011 | Lambert | ............... | H04M 9/085 |
| | | | | 379/406.8 |
| 8,019,076 B1 * | 9/2011 | Lambert | ............... | H04M 9/082 |
| | | | | 370/286 |
| 2003/0133565 A1 * | 7/2003 | Chang | ................... | H04M 3/493 |
| | | | | 379/406.1 |
| 2004/0136447 A1 | 7/2004 | LeBlanc | | |
| 2005/0053020 A1 * | 3/2005 | Thirumoorthy | ....... | H04M 9/082 |
| | | | | 370/286 |

OTHER PUBLICATIONS

ClearOne Technology—Delivering the Ultimate Audio Conferencing Experience obtained from http://www.clearone.com/solutions/technology.php, 2 pages.

Polycom Vortex EF2241 obtained from http://www.polycom.com/common/documents/support/sales_marketing/products/voice/vortex_ef2241_datasheet.pdf, 2 pages.

* cited by examiner

CONTROLLING ECHO IN A WIDEBAND VOICE CONFERENCE

RELATED APPLICATION

This application is a continuation of U.S. patent application Ser. No. 11/877,259, filed on Oct. 23, 2007, the contents of which are herein incorporated by reference.

TECHNICAL FIELD

Particular embodiments generally relate to telecommunications.

BACKGROUND

Voice telephony has been designed and implemented using narrowband technology. Narrowband technology transmits voice in the frequency spectrum substantially around the range 0 to 4000 hertz (Hz). User demand and efficient wideband coding technology make it possible to double the frequency range to 0-8000 Hz. A wideband coder/decoder (codec) may be used to encode and decode signals and may use different methodology in encoding and decoding signals in the low band (0-4000 Hz) and the high band (4000-8000 Hz) frequencies.

Echo may result when users are participating in a communication session. Echo cancellers are provided to cancel echo that may result when one or more parties are speaking. For example, when a first parry is in a point-to-point connection and is talking at the time, an echo canceller oriented, toward the second party end device cancels any talker echo that is reflected from the second party's end device. The echo canceller may be able to cancel signals that arc linear and time invariant (LTI) using an adaptively updated convolution processor. The convolution processor may estimate the echo signal and inject an inverse of the echo signal to cancel it. Codecs and other non-linear elements in the transmission path may introduce distortion, which causes signals to be non-linear and time-variant in the low band. Further, in a wideband communication session, even when the signals in the low band are linear and time invariant, signals in the high band may be non-linear and time-variant resulting in high band echo that is non-linear and time-variant. The convolution processor may not be able to cancel the non-linear and time-variant signals. Accordingly, a non-linear processor (NLP) may be used to further reduce or eliminate echo signals that are non-linear and time-variant. While the convolution processor analyzes the signals to inject the inverse removing the echo, the non-linear processor, which may act as a center clipper, attenuates any signals within a certain range when it is enabled. Any signals that are not canceled by the convolution processor may be attenuated by the non-linear processor when it is enabled.

A doubletalk condition occurs when multiple users speak at the same time. In this case, the echo cancellers experiencing the double-talk condition operate differently. For example, during double-talk, the non-linear processor experiencing double-talk is disabled from the transmission path. The non-linear processor is disabled because it otherwise would attenuate all signals. If the first and second users in a conference with many users are causing the double-talk condition, and the non-linear processors experiencing the double-talk are not disabled, the non-linear processors would attenuate the speech of the two users so neither could he heard by the other users. The non-linear processor is disabled for this case. The convolution processor may still remove echo in the low band; however, the echo in the high band may not be attenuated and thus users in the conference may hear any high band echo generated.

DESCRIPTION OF EXAMPLE EMBODIMENTS

Overview

In a teleconference it is desirable to remove echoes from each voice signal so that the echoes do not interfere with the intended direct voice signals. Such echoes may be created at each user end device (e.g., a phone handset, teleconferencing unit, intercom, etc.) and are often artifacts of signal processing that takes place in digital voice systems. In order to reduce echo, each end device may employ various signal processing techniques to prevent reflected signals from being sent out.

However, a problem occurs when two or more users are speaking at the same time (so-called "double-talk" condition). When an end device is simultaneously receiving a voice signal from a first user and is also attempting So transmit that end device user's voice signal, typical techniques that are used to cancel or diminish echoes from the first user's voice signal may adversely affect the end device user's direct voice signal. It is desirable to suppress artifacts such as echoes from the first user's voice signal while at the same time not adversely affect a second user's voice signal even when both types of signals are being processed in a single end device. Such a goal is complicated in wideband digital voice applications where low and high frequency voice data may have different characteristics that react differently to signal processing operations.

In a particular embodiment, when a double-talk condition is detected in a wideband conference, a non-linear processor (NLP) that would normally cancel both high and low frequencies is disabled. A convolution processor (CP) is used to cancel low-frequency echo. A high-frequency processor (HFP) is then used to attenuate high frequencies.

Example Embodiments

Figure 1:
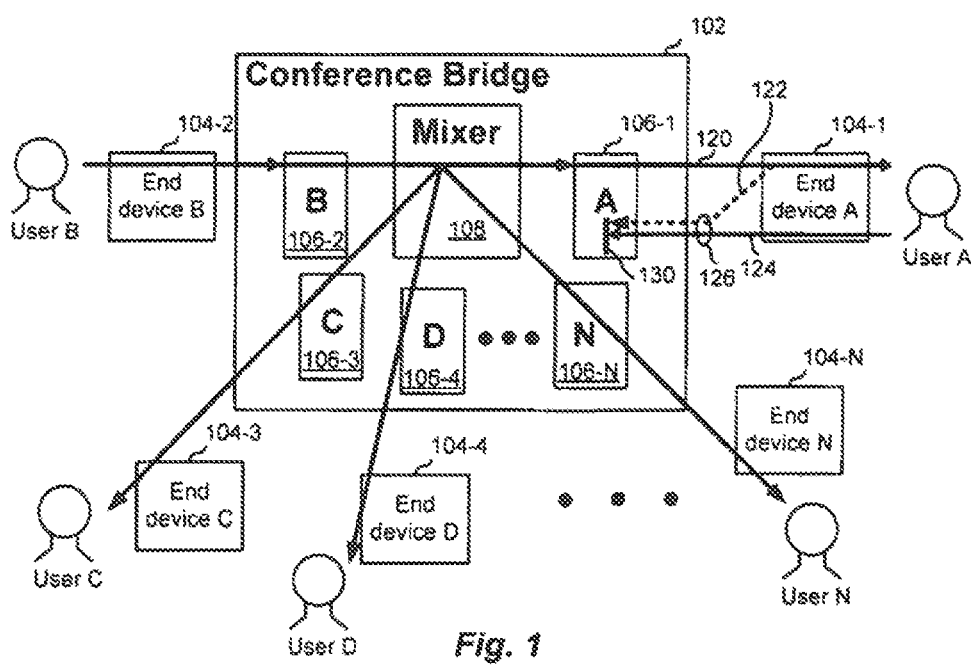
FIG. 1 depicts an example of a system for providing a wideband voice conference.

FIG. 1 shows an example of a system for providing a wideband voice conference. End user B's voice signal is transmitted via end device B to conference bridge 102. Conference bridge 102 includes echo cancellers 104, one for each endpoint. In other embodiments, echo cancellation functionality may be included at different points in the system (e.g., at the end devices, in the mixer, etc.). Separate echo cancellers need not be used for each end device as systems may be developed that use a single echo canceling device or process for more than one end device.

End user B's voice signal is provided from echo canceller 106-2 to mixer 108 for distribution to other end devices corresponding to other users, as shown. For purposes of illustration, features are shown with respect to a single end user, user A. it should be apparent that similar processing may be applied to any of the other users including user 8.

End user B's voice signal 120 proceeds through echo canceller A 106-1 and then to end device A 104-1 for presentation to user A. End device A introduces an echo or other unwanted reflection or artifact as illustrated by reflected signal 122. User A is also speaking to generate user A's direct voice signal 126. Reflected signal 122 and user A's direct voice signal overlap in time and are transferred along a common signal path 126 back to echo canceller 106-1. Echo canceller 106-1 acts to cancel reflected signal 122 as much as possible, but the processing of reflected signal 122 also affects user A's direct voice signal 124. The following discussion includes details of how reflected signal 122's energy is prevented or reduced from propagating back through the mixer to the other users while at the same time minimizing any unwanted effects upon user A's direct voice signal 124.

Specifically, when a double talk condition occurs (when two or more users are speaking at the same time), the high band is processed to reduce high band echo using a high frequency processor at echo canceller 106-1. For example, the high band of speaker's B voice signals are canceled at echo canceller 106-1 and is thus prevented from reaching end device 104-2 and being further propagated in a reflected signal to other end devices. The low band is allowed to reach end device 104-1, so that an echo in the low band may still be produced. However, the low band echo can be canceled with a convolution processor at echo canceller 106-1. Although end device 104-1 and 104-2 might experience the conference in a narrowband rendering (i.e., suppressed high frequencies) during the double-talk condition, all other end devices, such as end devices 104-3-104-N, continue to experience the conference in wideband.

The general operation of the system will now be described. Conference bridge 102 may be a device configured to provide a conference to end devices 104. A conference may be any communication session among two or more users. The communication session may include transfer of voice, data, etc. For example, voice signals may be received from different end devices 104, be mixed together, and sent to the other end devices 104. In one embodiment, conference bridge 102 allows one or more (up to all N) of the participants to talk at any instant and for all end devices 102 to hear. As shown, a total of N active devices 102 are bridged together in conference bridge 102.

In one embodiment, conference bridge 102 provides a wideband conference. A wideband conference may be where wideband coding technology makes it possible to provide a frequency range substantially around 0-8000 Hz. Although 0-8000 Hz is described, it will be understood that these frequencies may vary.

In one embodiment, for discussion purposes, each end device 104 is assumed to support a single user. However, multiple users may be using & single end device 104, such as by using a speaker phone. Also, each end device 104 may have an associated echo canceller 106, but in other embodiments, an echo canceller may be associated with multiple end devices 104.

Echo canceller 106 may be found in conference bridge 102. Echo cancellers 106 may be considered network echo cancellers in that they are situated in the network and not in end devices 104. It will be understood that echo cancellers 106 may be found in other locations, such as in end devices 104, in other network devices, etc.

Each echo canceller 106 is configured to cancel echo reflected from, end devices 104. That is, a tail of echo canceller 106 is facing end devices 104 and cancels echo received from end devices 104. If end device 104-1 and end device 104-2 are participating in a conference, then a user A is associated with end device 104-1 and a user B is associated with, end device 104-2. In one example, user A may speak and user B may be silent. If user A hears talker echo (the echo of what user A is saying), the echo usually results from the circuitry near end device 104-2, which is generating echo from user A talking. Accordingly, echo canceller 106-2 is configured to cancel the echo of user A talking that is reflected from end device 104-2. A method of canceling echo will be described in more detail below but generally canceling echo involves estimating echo that may be reflected from an incoming signal (e.g., other user's voice). Art estimate of the echo (any signals reflected from the other user's voice) is typically determined by estimating an impulse response using an adaptive filter that implements an algorithm which converges over time to the desired echo impulse response estimate. This adaptive filter (referred to as the Convolution Processor) may use any number of algorithms to estimate the impulse response (e.g., Least Means Squared (LMS), Normalized LMS) most of which are a class of algorithms called Gradient Decent Techniques. Other algorithmic classes may also be employed, such as numerical recursive techniques (e.g., Projections onto Convex Sets (POCS)). Also, if more than two callers are participating in the conference, then all users, such as users B, C, . . . , N may cancel echo of user A speaking. Echo cancellers 106-2-106-N may be canceling talker echo of user A.

Figure 2:
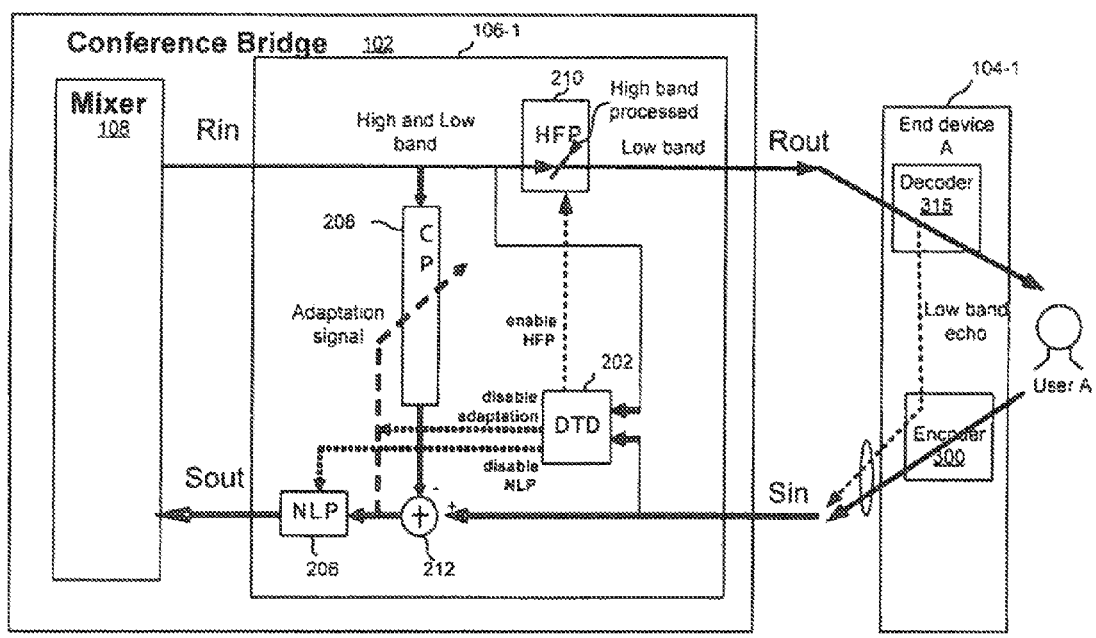
FIG. 2 depicts an example of an echo canceller.

FIG. 2 depicts an example of echo canceller 106. Echo canceller 106 includes a $R_{in}$ and $R_{out}$, which correspond to a receive direction for end device 104. That is, the arrow from mixer 108 to echo canceller 106 represents $R_{in}$ and the arrow from echo canceller 106 to end device 104 represents $R_{out}$. The voice signals may go through a decoder 315 and be decoded, the operation of which is described further in FIG. 3B. Also, $S_{in}$ and $S_{out}$ represent the send direction. That is, any echo that may be reflected back from end device 104 in addition to any voice from a user speaking is sent in this direction. $S_{in}$ corresponds to the arrow from end device 104 to echo canceller 106 and $S_{out}$ corresponds to the arrow from echo canceller 106 to mixer 108. Also, voice signals from User B speaking may be encoded by encoder 300, the operation of which is described further in FIG. 3A.

A convolution processor (CP) 208 is configured to cancel echo reflected from end device 104 in $S_{in}$ direction. In one embodiment, convolution processor 208 may be a finite impulse response (FIR) filter adapted by a gradient technique, such as a normalized least-mean squared algorithm. Convolution processor 208 may cancel echo that is linear and time-invariant. For example, convolution processor 208 uses a signal received at echo canceller 106 at $R_{in}$ and an adaptation signal to create an estimate of the echo impulse as a function of time. For example, the original signal received, of a user speaking is used to estimate any echo that may result. Convolution processor 208 then uses the estimate of the echo signal to eliminate the echo that ultimately results. That is, the impulse response estimate when convolved with the signal at $R_{in}$ yields an echo estimate that, when subtracted from the true echo, eliminates a substantial portion of the echo signal that is reflected in the $S_{in}$ to $S_{out}$ direction. For example, summation block 212 subtracts the echo estimate from $S_{in}$ using the impulse response estimate. The signal at the output of summation block 212 is typically called the error signal because if a user is not speaking and the echo path impulse response is perfectly linear and time invariant, the signal should be zero if the impulse response estimate was perfect. However, the cancellation may not be perfect, and if not, a signal at this point is representative of the error in approximating the echo path and is used to update convolution processor 208 towards a better conversion estimate. However, when the description refers to "canceling echo", it will be understood that canceling echo may be determining a signal that may cancel some part of the echo. For example, the cancellation may determine that an impulse response path may or may not be perfectly LTI, and convolution processor 208 is not able to perfectly cancel the echo signal. Also, error correction of the impulse to converge to a better echo cancellation may be performed.

Signals in the low band are mostly linear and time invariant in nature and a resulting echo signal is a linear and time invariant function of the original signal and convolution processor 208 can effectively cancel the echo in the low band. However, some telephony codecs and circuitry may be non-linear (i.e., introduce distortion) and sometimes are time-variant and convolution processor 208 cannot fully cancel the echo. Accordingly, a non-linear processor (NLP) 206 is implemented after convolution processor 208 to reduce or eliminate any residual echo. In one embodiment, non-linear processor 206 is a center clipper, which attenuates signals within a certain range. Non-linear processor 206 acts on the output of convolution processor 208 by attenuating the output so as to make it inaudible. Accordingly, any signal output from summation block 212 may be attenuated by non-linear processor 206.

Figure 3A:
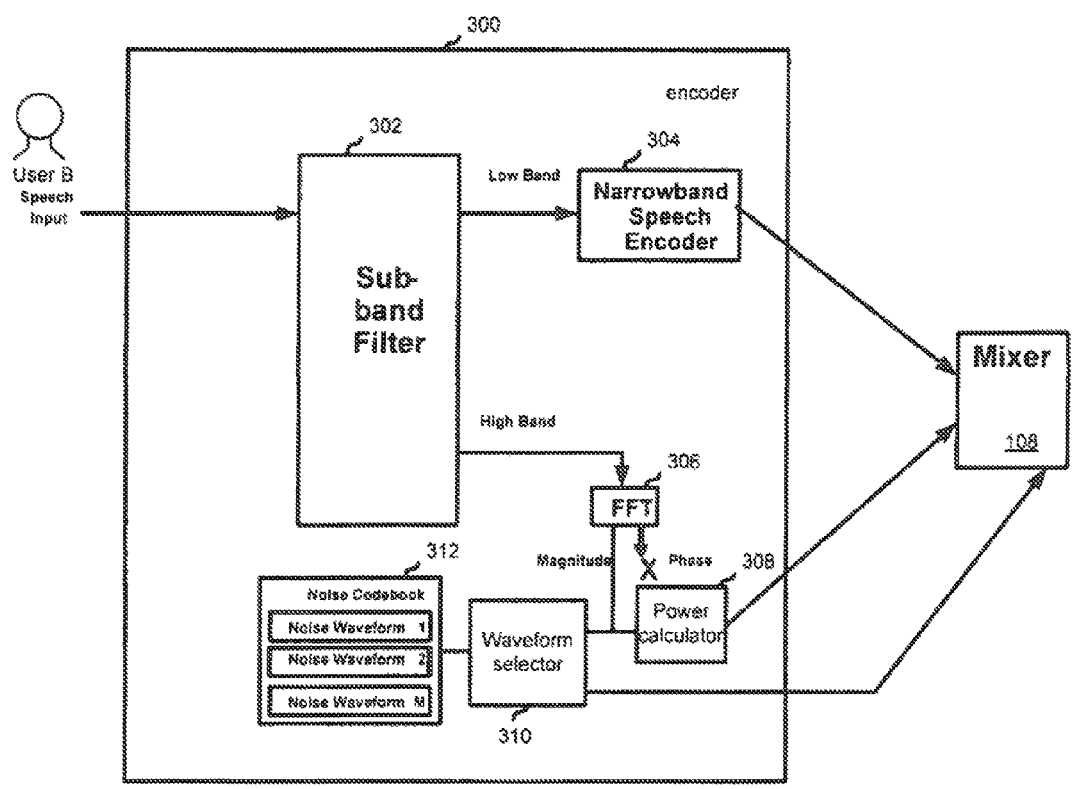
FIG. 3A depicts an example of an encoder of an end device.

When the conference is a narrowband conference, the echo produced is usually linear and time-invariant to a reasonably high degree. The degree to which such a conference is LTI is primarily determined by the encoding methods and circuitry used and the noise floor of the system. However, a wideband conference may introduce signal, components that are mostly non-linear and time-variant in the high band. Accordingly, convolution processor 208 cannot effectively cancel echo produced in the high band and non-linear processor 206 is used to attenuate the echo produced in the high band. To better illustrate why NLP 206 is needed, FIG. 3A depicts an example of an encoder 300 of an end device 104-2. The encoder pictured is from an end device in which User B is speaking where the encoded voice signals are sent to mixer 108, and then to User A.

In this embodiment, sub-band filter 302 receives voice input from a user using end device 104. Sub-band filter 302 is configured to separate the low band (0-4000 Hz) from the high band (4000-8000 Hz). The low band is then coded using narrowband voice encoder 304, Narrowband voice encoder 304 typically preserves most of the linear and time-invariant (LTI) nature of the low band signal. Accordingly, most of this portion of the signal can be cancelled using convolution processor 208.

The high band signal is typically encoded using a methodology where the spectrum is matched, the following description provides such an example. For example, a Fast Fourier Transform (FFT) 306 is used to match a spectral magnitude of the high band signal. Although a fast Fourier transform is described, it will be understood that other spectral estimation techniques, such as line spectral pairs (LSPs) or cepstrum or linear prediction (LP) or other numerical methods, may be used and typically are to obtain a spectral estimate of the high band signal. The magnitude of the high band signal and the phase is output by fast Fourier transform 306. In this example, a waveform selector 310 then selects a waveform from noise code book 312 that is most like the spectral magnitude of the high band signal. The phase/time information is not taken into account when the noise waveform is selected. The human ear may be relatively insensitive to the phase of the signal in the high band and a waveform that takes into account spectral magnitude may be used without regard to the phase. A waveform from noise codebook 310 is determined that is representative of the entirety of human speech, and does not take phase/time into account. Although a noise codebook methodology is provided here as an example, it will be understood that other spectral estimate representations may also be employed, such as parametric models for specifying the high band spectra. The fundamental characteristic is that whatever method is employed, that the high band representation, is based on the high band spectrum and not the phase/time information in the high band signal.

Figure 3B:
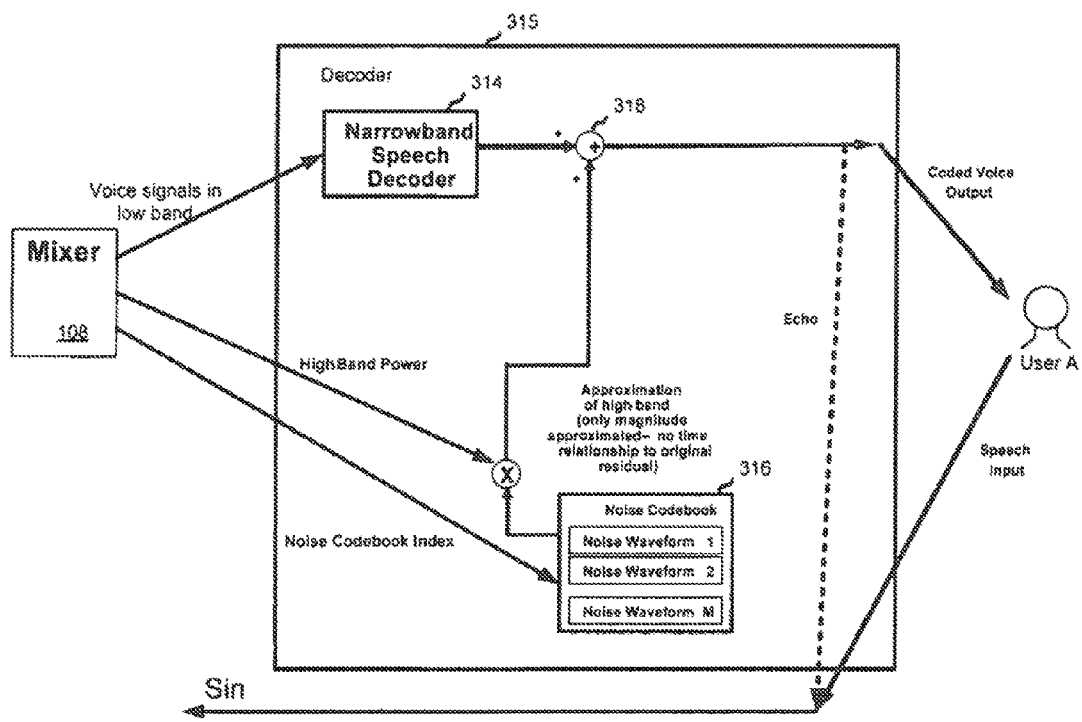
FIG. 3B depicts an example of a decoder configured to decode encoded voice.

In this example, the power calculator 308 then calculates the power using the spectral magnitude estimate. The index of the noise waveform selected and the spectral magnitude power estimate are sent to mixer 108 in conference bridge 102. Mixer 108 may then mix the signal and send the mixed signal to end devices 104. The decoding portion is described to illustrate why non-linear processor 206 may be disabled when double talk results. FIG. 3B depicts an example of a decoder 315 configured to decode encoded voice received from the encoder of end device 104 for User A. The loss of time/phase information means that the high band portion of the estimated signal that is going to be rendered at the decoder is time-variant with regard to the encoder high band signal. This means that convolution processor 208 may be unable to cancel the high band portion of the signal due to the high band signal being time-variant. Accordingly, NLP 206 is used to attenuate the signal output by summation block 212. This attenuation, is in both the low band and the high band.

Narrowband speech decoder 314 is configured to decode the low band signal. Also, the high band power and noise codebook index is received by decoder 315. A noise waveform from noise codebook 316 may then be determined based on the index. For example, if a noise waveform 2 was chosen in the encoder 312, then noise waveform 2 from noise codebook 316 is determined. A multiplication of the high band power and noise waveform is then determined providing an approximation of the high band is determined. This approximation is magnitude approximated and no time relationship to the original high band signal is provided. The high band signal and low band signal are then added in summation block 318 and decoded voice output is sent to $S_{in}$ of echo canceller 106. Because a magnitude approximation of the original high band signal is used, any echo produced in the high band has no time relationship to the original signal. In echo cancellation, convolution processor 208 may analyze the original signal (the signal received in the $R_{in}$ to $R_{out}$ path) and generate an estimate of any echo produced by that signal. Because of the high band time invariance, any high band estimate of the echo may be highly inaccurate and effective high band echo reduction may not be possible. Thus, non-linear processor 206 is used to attenuate any echo resulting from non-linear time variant signals. This, however, attenuates any signals in the transmission path from $S_{in}$ to $S_{out}$. This is fine when double talk is not occurring but when a double talk condition occurs, non-linear processor 206 would attenuate both User B's reflected voice signal and User A's original voice signal. All other listeners would not receive User A's and User B's voice signals, Referring back to FIG. 2, the above use of convolution processor 208 and non-linear processor 206 may be effective when one user is speaking at a time. However, when multiple users speak substantially simultaneously, referred to as double-talk, non-linear processor 206 is disabled from the path for any active talker. Although the word double is used, it will be understood that double talk may include more man two users speaking at the same time.

Double-talk detector 202 is configured to detect when a double-talk condition exists. For example, the path from $R_{in}$ is monitored and double-talk detector 202 determines when active speech is being received and sent at the same time. In one example, if users A and B using end devices 104-1 and 104-2 are speaking, then also echo cancellers 106-1 and 106-2 are in a double talk condition. Callers C-N may also be silent at this time and echo cancellers 106-3 to 106-N are not in a double talk condition and operate as described above using convolution processor 208 and non-linear processor 206.

Double-talk detector 202 is then configured to disable non-linear processor 206. Further, the adaptation of the error signal from summation block 212 is typically disabled. Double-talk detector 202 disables non-linear processor 206 and the adaptation because user A is now talking. If non-linear processor 206 was enabled and attenuating the signal, from summation block 212, then the voice of user A would be attenuated in addition to any echo from user B. Thus, other users (e.g., users B-N) would not hear what user A is saying. Further, the adaptation signal is disabled (or its adaptation rate greatly reduced) because the error signal contains, from a power standpoint, much more of the near-end user energy than the far-end energy that should be canceled. Although it is still possible to use the error signal to help converge the convolution processor's echo estimate under double-talk, it is usually prudent to lessen its adaptation rate under the double-talk condition due to this energy contrast consideration. The convolution processor 208 itself however, is not disabled. This is because convolution processor 208 cancels linear time-invariant signals in which it can form an acceptable estimate of the echo, as the impulse response of the echo does not usually meaningfully change during the usually short duration of doubletalk. Because the echo signal can be estimated, it can be accurately canceled from signals received from an end device without canceling the voice of a user speaking. For example, if signals received include both the user speaking and echo reflected from another user speaking, the echo is canceled from the signal but the signals including the user speaking are passed and can be sent to mixer 108 for sending to other users.

When non-linear processor 206 is disabled, echo may result from the high band in the wideband conference. Particular embodiments provide a high frequency processor 210, shown in FIG. 2, that is configured to remove high band echo when a double-talk condition is detected. When double-talk detector 202 detects a double-talk condition, high-frequency processor 210 is enabled. High-frequency processor 210 is configured to process the high band of a signal to limit the high band echo. In one embodiment, high-frequency processor 210 includes a low pass filter in the direction of $R_{in}$ to $R_{out}$. In this case, the low band signal coming from mixer 108 is allowed to pass through unaffected but the high band is attenuated. By attenuating the high band, the high band signal is substantially removed and any high band echo cannot be produced. For example, if signals in the high band are eliminated from reaching end device 104-1, then echo is not reflected by end device 104-1 in the high band.

High frequency processor 210 is enabled in echo canceller 106-1 for end device 104-1 (the user speaking). This has the effect, of removing the high band from reaching end device 104-1. Because the low band is allowed to reach end device 104-1, an echo in the low band may still be produced. However, convolution processor 208 is configured to cancel the low band echo because it is linear and time invariant. The low band is effectively cancelled at echo canceller 106-1 and a high band echo does not occur. Also, by using high frequency processor 210, the speaking user's voice is not canceled, such as echo canceller 106-1 does not cancel user A's voice. Although, end device 104-1 experiences the conference in a narrowband rendering during the double-talk condition, other end devices not in the double-talk condition, such as end devices 104-3-104-N, continue to experience the conference in wideband (i.e., high frequency processor 210 is not enabled). Also, convolution processor 208 and non-linear processor 206 continue to cancel echo for end devices 104-3-104-N. Thus, end devices 104-3-104-N continue to receive the wideband signals and have any echo produced canceled. Having convolution processor 208 and non-linear processor 206 enabled is acceptable in end devices 104-3-104-N because these users are not speaking and the problem of having a user's own voice attenuated is not present. Accordingly, other participants not in the double talk-condition continue to have wideband sound with good echo control.

Although high-frequency processor 210 is shown in the path from $R_{in}$ to $R_{out}$, it will be understood that it may be found in other locations, such as in between $S_{in}$ and $S_{out}$. If high-frequency processor 210 is found between $S_{in}$ and $S_{out}$, all the participants would hear a low pass rendering of the speakers during double-talk. Thus, the high baud may be filtered out of the voice from users A and B. Other locations of placing high-frequency processor 210 may also be appreciated.

Figure 4:
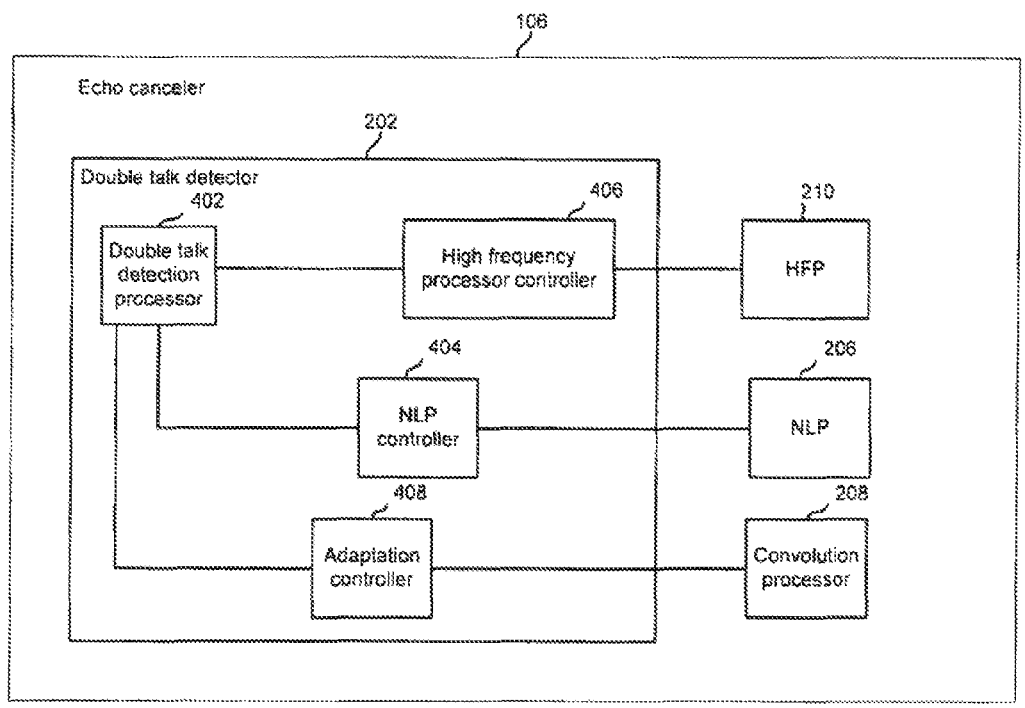
FIG. 4 depicts a more detailed embodiment of a double-talk detector.

FIG. 4 depicts a more detailed embodiment of double-talk detector 402. A double-talk detector 402 is configured to detect when a double-talk condition is present. For example, a signal from the $R_{in}$ to $R_{out}$ path and a signal from $S_{in}$ may be analyzed to determine if more than one user is speaking at the same time. In some double-talk detector designs, a "soft-decision" is made which outputs a quantity that is indicative of the probability or likelihood of double-talk.

When double-talk is detected, double-talk detector 402 is configured to notify an NLP controller 404. NLP controller 404 then disables or modifies the characteristics of the non-linear processor 206. In some NLP designs, the NLP is a "soft NLP" that changes the amount of attenuation based on the soft decision of the double-talk detector and/or smoothing of the decision of the double-talk detector 402 in time. The soft decision is when a gradual modification of NLP controller 404 is performed. This is in contrast to a complete disabling of NLP controller 404 at a moment in time. Also, when double-talk is detected, double-talk detector 402 is configured to notify an adaptation controller 408. Adaptation controller 408 disables or greatly slows the adaptation of the convolution processor 208 for convergence reasons previously described.

Also, when double-talk is detected, high-frequency processor controller 406 is then configured to enable high-frequency processor 210. For example, a signal may be sent to high-frequency processor 210 causing it to be activated. In one example, a low pass filter may then be enabled. The system may then operate as described above when the double talk condition is detected. Similarly to NLP controller 404 and adaptation controller 408, the high frequency processor controller may accept soft decisions from double-talk detector 402 and either enable or modify the characteristics of the high-frequency processor based on the double-talk detector soft decision.

Figure 5:
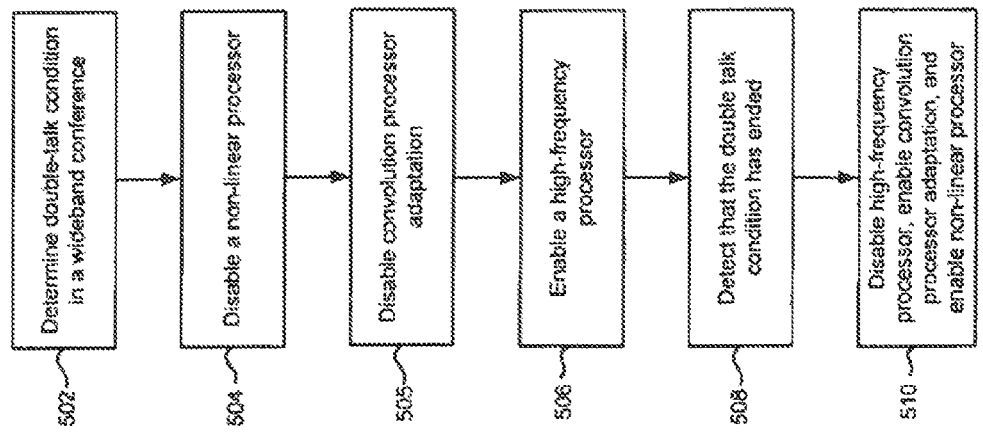
FIG. 5 depicts an example of a method for reducing echo in the high band.

FIG. 5 depicts an example of a method for reducing echo in the high band. In one embodiment, the method may be performed by echo cancellers 106 associated with end devices 104 that are causing the double-talk condition (i.e., the users speaking).

In step 502, a double-talk condition is determined in a wideband conference. For example, a double-talk condition may result when users for end devices 104-1 and 104-2 are speaking simultaneously.

In step 504, a non-linear processor 206 is disabled or otherwise modified as per above. Also, in step 505, the adaptation of convolution processor 208 may be disabled or its adaptation rate reduced as per above.

In step 506, a high-frequency processor 210 is then enabled or otherwise adjusted as per above. This enables the attenuation of the high band for signals. Accordingly, the low band will still be passed through to users of end devices 104-1 and 104-2, which filters the wideband signals. Users at end devices 104-1 and 104-2 may be experiencing a narrowband conference; however, other users using end devices 104-3-104-N still receive wideband signals and continue to participate in a wideband conference assuming high frequency processor 210 is in the path from $R_{in}$ to $R_{out}$ path of the embodiment described above.

In step 508, double talk detector 202 detects that the double talk condition has ended. For example, one of the users may stop talking.

In step 510, double talk detector 202 disables high-frequency processor 210, enables the adaptation of the convolution processor 208, and enables non-linear processor 206. This allows users that were previously in double talk to experience the wideband conference again. It is understood that in other embodiments, the double-talk decision of 502 may be soft as described above and that FIG. 5 represents the steps involved for a hard double-talk decision for clarity purposes.

Accordingly, particular embodiments provide many advantages. For example, echo is controlled for connections that employ wideband codecs that are time-variant for some portion of their audio bandwidth. The conference participants engaged in double-talk generate less echo for other users. Also, the participants engaged in the double-talk have improved echo performance because the high band echo is eliminated. Conference participants not engaged in the double-talk have active echo control unaffected. Thus, the participants not engaged in double-talk hear full wideband sound performance.

Although the description has been described with respect to particular embodiments thereof, these particular embodiments are merely illustrative, and not restrictive. Although a conference is discussed, it will be understood that particular embodiments may be used in any communication session.

In the description herein, numerous specific details are provided, such as examples of components and/or methods, to provide a thorough, understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Particular embodiments can be implemented in the form of control logic in software or hardware or a combination of both. The control logic, when executed by one or more processors, may be operable to perform that which is described in particular embodiments.

It will also be appreciated that one or more of the elements depicted in the drawings/figures can also be implemented in. a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should he considered only as exemplary, and not limiting, unless otherwise specifically noted. Furthermore, the term "or" as used herein, is generally intended to mean "and/or" unless otherwise indicated. Combinations of components or steps will also be considered as being noted, where terminology is foreseen, as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while the present invention has been described herein with reference to particular embodiments thereof, a latitude of modification, various changes and substitutions arc intended in the foregoing disclosures, and it will be appreciated that, in some instances some features of particular embodiments will be employed without a corresponding use of other features without, departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

The invention claimed is:

1. A method comprising:
    receiving, at a device, an incoming voice signal from a remote source in a wideband conference, wherein the incoming voice signal includes a low band and a high band;
    detecting a double talk condition at the device, wherein the double talk condition is due to a local voice signal being originated by a local user at a same time the incoming voice signal is received; and
    based on detecting the double talk condition, processing, by the device, the incoming voice signal and the local voice signal to reduce an echo in an outgoing voice signal that includes the local voice signal, wherein processing includes:
        disabling an attenuation of an outgoing voice signal,
        enabling a high frequency processor, the high frequency processor:
            removing the high band from the incoming voice signal, and
            allowing the low band associated with the incoming voice signal to pass through the high frequency processor, and
        canceling, without use of an adaptation signal, an echo generated due to the low band associated with the incoming voice signal that is passed through the high frequency processor.

2. The method of claim 1, wherein users other than the local user receive the incoming voice signal in the low band and the high band.

3. The method of claim 1, wherein removing the high band from the incoming voice signal causes an end device associated with the local user to receive the incoming voice signal in the low band but not in the high band.

4. The method of claim 1, wherein removing the high band comprises using a low pass filter to filter the incoming voice signal in the high band while allowing the incoming voice signal in the low band to pass.

5. The method of claim 1, wherein disabling an attenuation of the outgoing voice signal comprises disabling a non-linear processor configured to cancel non-linear and time variant portions of an echo due to the high band.

6. The method of claim 1, wherein canceling, without use of an adaptation signal, the echo generated due to the low band comprises disabling the adaptation signal during the double talk condition.

7. The method of claim 1, wherein the low band is associated with a frequency range of 0-4000Hz, and wherein the high band is associated with a frequency range of 4000-8000Hz.

8. A tangible, non-transitory, computer-readable media having software encoded thereon, the software, when executed by a processor, operable to:
receive an incoming voice signal from a remote source in a wideband conference, wherein the incoming voice signal includes a low band and a high band;
detect a double talk condition at a device, wherein the double talk condition is due to a local voice signal being originated by a local user at a same time the incoming voice signal is received; and
based on detecting the double talk condition at the device, process the incoming voice signal and the local voice signal to reduce an echo in an outgoing voice signal that includes the local voice signal, wherein the process includes:
disabling an attenuation of an outgoing voice signal,
enabling a high frequency processor, the high frequency processor:
removing the high band from the incoming voice signal, and
allowing the low band associated with the incoming voice signal to pass through the high frequency processor, and
cancelling, without use of an adaptation signal, an echo generated due to the low band associated with the incoming voice signal that is passed through the high frequency processor.

9. The computer readable medium of claim 1, wherein users other than the local user receive the incoming voice signal in the low band and the high band.

10. The computer readable medium of claim 8, wherein removal of the high band from the incoming voice signal causes an end device associated with the local user to receive the incoming voice signal in the low band but not in the high band.

11. The computer readable medium of claim 8, wherein the software when executed operable to remove the high band is further operable to use a low pass filter to filter the incoming voice signal in the high band while allowing the incoming voice signal in the low band to pass.

12. The computer readable medium of claim 8, wherein the software when executed operable to disable an attenuation of the outgoing voice signal is further operable to disable a non-linear processor configured to cancel non-linear and time variant portions of an echo due to the high band.

13. The computer readable medium of claim 8, wherein the software when executed operable to cancel the echo due to the low band is further operable to initiate a convolution processor to cancel linear time invariant echo due to the low band.

14. An apparatus comprising:
a processor; and
logic encoded in a non-transitory machine-readable media for execution by the processor and when executed cause the processor to perform functions including:
receiving an incoming voice signal from a remote source in a wideband conference, wherein the incoming voice signal includes a low band and a high band;
detecting a double talk condition, wherein the double talk condition is due to a local voice signal being originated by a local user at a same time the incoming voice signal is received; and
based on detecting the double talk condition, process the incoming voice signal and the local voice signal to reduce an echo in an outgoing voice signal that includes the local voice signal, wherein the process includes:
disabling an attenuation of an outgoing voice signal,
enabling a high frequency processor, the high frequency processor:
removing the high band from the incoming voice signal, and
allowing the low band associated with the incoming voice signal to pass through the high frequency processor, and
canceling, without use of an adaptation signal, an echo generated due to the low band associated with the incoming voice signal that is passed through the high frequency processor.

15. The apparatus of claim 14, wherein users other than the local user receive the incoming voice signal including the low band and the high band.

16. The apparatus of claim 14, wherein removing the high band from the incoming voice signal causes an end device associated with the local user to receive the incoming voice signal in the low band but not in the high band.

17. The apparatus of claim 14, wherein removing the high band comprises using a low pass filter to filter the incoming voice signal in the high band while allowing the incoming voice signal in the low band to pass.

18. The apparatus of claim 14, further comprising logic when executed cause the processor to perform functions including disabling a non-linear processor configured to cancel non-linear and time invariant portions of the echo due to the low band when the double talk condition is detected.

19. The apparatus of claim 14, wherein the logic operable to cancel the echo comprises logic that when executed cause the processor to perform functions including using a convolution processor to cancel linear time invariant echo due to the low band.

20. The apparatus of claim 14, wherein the low band is associated with a frequency range of 0-4000Hz, and wherein the high band is associated with a frequency range of 4000-8000Hz.

* * * * *